(12) United States Patent
Rurs

(10) Patent No.: US 11,996,877 B2
(45) Date of Patent: May 28, 2024

(54) SYSTEMS AND METHODS FOR PROVIDING BUOYANT ELECTRONIC DEVICES

(71) Applicant: Appear Inc., San Francisco, CA (US)

(72) Inventor: Prashant Rurs, San Francisco, CA (US)

(73) Assignee: APPEAR INC., San Francisco, CA (US)

( * ) Notice: Subject to any disclaimer, the term of this patent is extended or adjusted under 35 U.S.C. 154(b) by 178 days.

(21) Appl. No.: 17/582,610

(22) Filed: Jan. 24, 2022

(65) Prior Publication Data

US 2023/0238996 A1 Jul. 27, 2023

(51) Int. Cl.
*H04B 1/3888* (2015.01)
*B32B 7/12* (2006.01)

(52) U.S. Cl.
CPC ............. *H04B 1/3888* (2013.01); *B32B 7/12* (2013.01); *B32B 2457/00* (2013.01); *B32B 2571/00* (2013.01)

(58) Field of Classification Search
CPC ..... H04B 1/3888; B32B 7/12; B32B 2457/00; B32B 2571/00
See application file for complete search history.

(56) References Cited

U.S. PATENT DOCUMENTS

| 2008/0057822 A1 | 3/2008 | Curtis et al. |
| 2008/0142402 A1* | 6/2008 | Kames ................ G07F 17/0092 206/559 |
| 2009/0115928 A1* | 5/2009 | Shin .................. G02F 1/133308 445/24 |
| 2010/0311475 A1* | 12/2010 | Takatsuka ............... H04M 1/18 455/575.1 |

(Continued)

FOREIGN PATENT DOCUMENTS

| CN | 104580557 | 4/2015 |
| CN | 111831069 | 10/2020 |
| JP | 2011-205196 | 10/2011 |

OTHER PUBLICATIONS

Notice of Reasons for Refusal issued in Japanese Patent Application No. 2021-516328 dated Jun. 13, 2023 (16 pages).

(Continued)

*Primary Examiner* — Yuwen Pan
*Assistant Examiner* — Fatuma G Sherif
(74) *Attorney, Agent, or Firm* — Fox Rothschild LLP; Carol Thorstad-Forsyth

(57) ABSTRACT

Systems and methods for providing a buoyant portable device. The buoyant portable device, comprising a frame and layers disposed in the frame. The layers comprise a first layer spaced apart from a stack of densely packed second layers such that a hollow cavity filled with air resides between the first layer and second layers. The hollow cavity has a size/shape providing an overall density of the mobile device that is below a density of a liquid that the mobile device displaces when the mobile device is disposed in the liquid. The second layers comprise an electronic layer residing adjacent to a cover/display layer. The cover/display layer is configured to allow a user to interact with electronic components of the electronic layer and has an overall weight less than a combined weight of the frame and at least the first layer of the plurality of layers.

18 Claims, 18 Drawing Sheets

(56) References Cited

U.S. PATENT DOCUMENTS

| | | | |
|---|---|---|---|
| 2014/0354558 A1* | 12/2014 | Cho | G06F 3/0412 |
| | | | 345/173 |
| 2016/0054770 A1* | 2/2016 | Bhardwaj | H05K 13/04 |
| | | | 361/679.54 |
| 2018/0263133 A1* | 9/2018 | Lu | H05K 5/069 |
| 2020/0068277 A1* | 2/2020 | Drewett | H04B 5/0031 |

OTHER PUBLICATIONS

International Search Report and Written Opinion for International PCT Patent Application No. PCT/US23/61166 mailed May 17, 2023 (9 pages).

\* cited by examiner

SYSTEMS AND METHODS FOR PROVIDING BUOYANT ELECTRONIC DEVICES

STATEMENT OF THE TECHNICAL FIELD

The present document concerns electronic devices. More specifically, the present document concerns systems and methods for providing buoyant electronic devices (e.g., communication devices).

DESCRIPTION OF THE RELATED ART

There are many electronic devices known in the art. The electronic devices include communication devices such as portable phones (e.g., smart phone). Conventional portable phones are not designed to float in a body of water. Accessories exist to provide buoyancy to the portable phones. However, these accessories are expensive, can damage the portable phones, and take away from the overall look of the portable phones.

SUMMARY

This document concerns systems and methods for providing a buoyant portable device (e.g., a smart phone or computer). The buoyant portable device comprising a frame and a plurality of layers disposed in the frame. The plurality of layers comprises a first layer spaced apart from a stack of densely packed second layers such that a hollow cavity filled with air resides between the first layer and the stack of densely packed second layers. The hollow cavity has a size and shape providing an overall density of the buoyant portable device that is below a density of a liquid (e.g., water) that the buoyant portable device displaces when the buoyant portable device is disposed in the liquid. The stack of densely packed second layers comprises at least an electronic layer residing adjacent to a cover/display layer. The cover/display layer is (i) configured to allow a user to interact with electronic components of the electronic layer and (ii) has an overall weight less than a combined weight of the frame and at least the first layer of the plurality of layers.

It should be noted that a stable upward buoyant force is applied to the buoyant portable device when the buoyant portable device is disposed in the liquid that is larger than a weight of the buoyant portable device. In this regard, the first layer has a density equal to, less than or more than a density of the liquid. The hollow cavity may occupy 5% to 25% of a total volume of the buoyant portable device. In some scenarios, the hollow cavity may occupy more than 25% of the total volume of the buoyant portable device. The buoyant portable device is designed such that a center of gravity thereof will cause the buoyant portable device, when disposed in the liquid, to float horizontally on a surface of the liquid with the cover/display layer facing an upward direction and residing above the surface of the liquid. The center of gravity may be aligned with a vertical axis of the buoyant portable device and offset from a horizontal axis of the buoyant portable device. The vertical axis extends from the first layer to the cover/display layer. The horizontal axis extends perpendicular to the vertical axis.

In those or other scenarios, the electronic layer comprises a battery located between at least two spaced apart circuit boards. The battery may comprise a graphene-based battery. The cover/display layer may comprise a graphene-based cover/display or a cover (e.g., glass sheet) backed with a display (e.g., a Liquid Crystal Display (LCD) screen, an Organic Light Emitting Diode (OLED) display screen, flexible-OLED display screen, plastic OLED display screen, graphene display screen or other type of display screen). The display can be attached to the cover via lamination or adhesive. The cover may include, but is not limited to, a piece of relatively thin glass with a layer of nano-fluid rubbed thereon for increasing its strength. The nano-fluid comprises nano-particles suspended in the fluid which can be dispensed via a dropper tool.

In those or other scenarios, the buoyant portable device has a balanced distribution of weight in a horizontal plane of the buoyant portable device at least partially defined by the cover/display layers. For example, the frame has a uniform thickness in the horizontal plane and the electronic layer has a balanced distribution of weight in the horizontal plane. Alternatively, the electronic layer has an unbalanced distribution of weight in the horizontal plane and the frame has a non-uniform thickness configured to balance a distribution of weight of the buoyant portable device in view of the unbalanced distribution of weight of the electronic layer. The non-uniform thickness of the frame may be provided by at least one detent or protrusion formed on an at least one sidewall of the frame.

In those or other scenarios, a size of the hollow cavity is variable. An internal motorized mechanism of the buoyant portable device is configured to cause a change in the size of the hollow cavity. Operations of the internal motorized mechanism may be enabled in response to a condition sensed by a sensor of the buoyant portable device. The condition can include, but is not limited to, a level or amount of the liquid in a surrounding environment, an amount of pressure being applied to the buoyant portable device by the liquid, a depth of the electronic device within the liquid, and/or an amount of time the electronic device is located at least partially in the liquid.

BRIEF DESCRIPTION OF THE DRAWINGS

This disclosure is facilitated by reference to the following drawing figures, in which like numerals represent like items throughout the figures.

DETAILED DESCRIPTION

Figure 1:
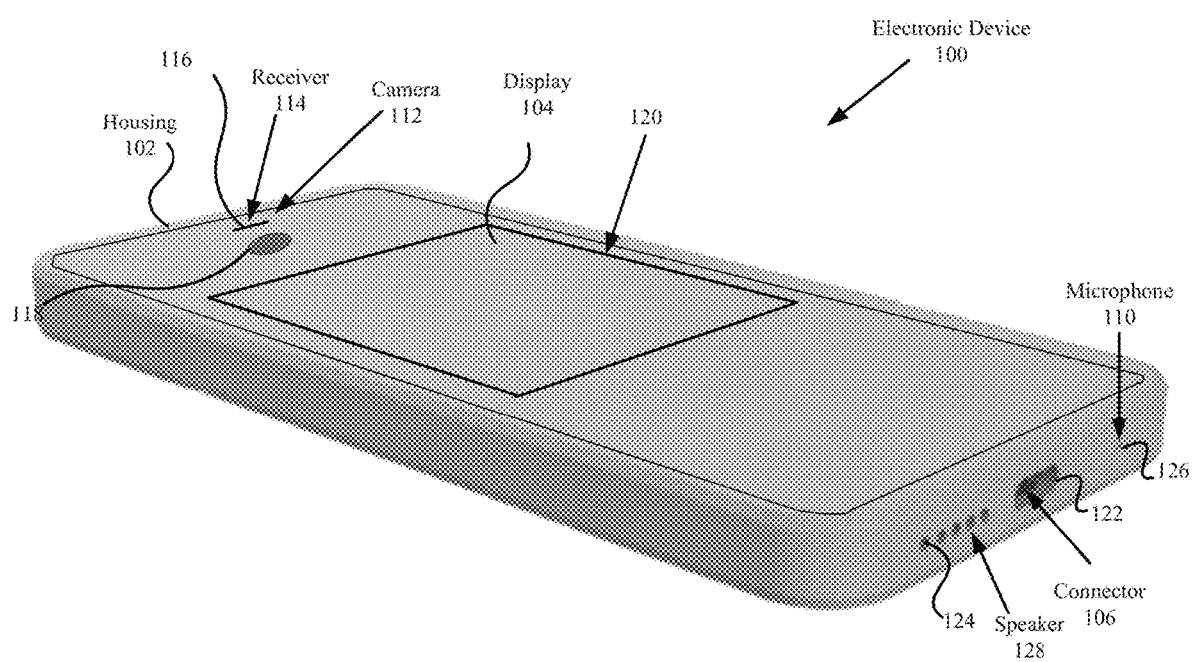
FIG. 1 provides a perspective view of an illustrative electronic device (e.g., a buoyant portable device).

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, there are many electronic devices known in the art. The electronic devices include communication devices such as portable phones (e.g., smart phone), portable computers, tablets, personal digital assistants, portable music players, portable gaming devices, handheld transceivers, portable two-way radios, portable electric machines (e.g., barcode scanners), portable electric tools (e.g., cordless tool), and other devices. Conventional portable phones are not designed to float in a body of water (e.g., a lake, a swimming pool, the ocean, etc.) and typically experience damage from water exposure or pressure when left in water for more than 30 minutes at a depth equal to or greater than 1 meter. Accessories exist to provide buoyancy to the portable phones. However, these accessories are expensive, can damage the portable phones, and take away from the overall look of the portable phones. The present invention provides a novel solution that overcomes the drawbacks of these portable phones and conventional accessories. For example, the portable phones of the present solution are designed such that they do not experience damage from water exposure or pressure when left in water for more than 30 minutes at any depth.

The present solution comprises electronic devices that are designed to have buoyancy without the need for any accessories. The electronic devices can float on the surface of a liquid (e.g., water) in a horizontal manner. This allows users to quickly locate and retrieve the electronic device when dropped or otherwise disposed in the liquid.

When the electronic device is dropped or otherwise disposed in liquid, its unique structure causes the body of liquid to create a stable upward buoyant force which is larger than the weight of the electronic device which results in the electronic device being lifted onto the surface of the liquid. The electronic device has a center of gravity that causes the electronic device (i) to float horizontally on the surface of liquid with the display screen facing in an upwards direction and (ii) to reside out of and/or above the surface of liquid.

Figure 2:
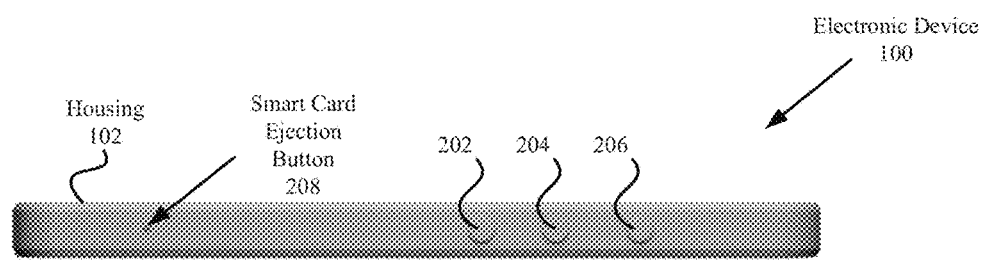
FIG. 2 provides a side view of the electronic device shown in FIG. 1.
Figure 3:
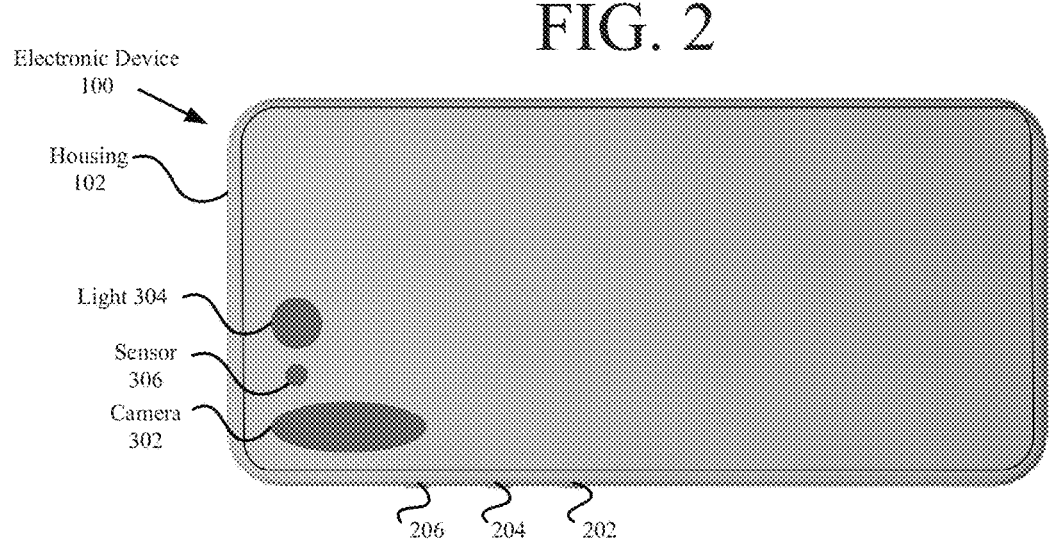
FIG. 3 provides a back view of the electronic device shown in FIG. 1.

Referring now to FIGS. 1-3, there are provided illustrations of an electronic device 100 implementing the present solution. The electronic device 100 is shown as comprising a mobile phone. The present solution is not limited in this regard. The electronic device can include, but is not limited to, a smart phone, a portable computer, a tablet, a personal digital assistant, a portable music player, a portable gaming device, a handled transceiver, a portable two-way radio, a portable electric machine (e.g., barcode scanner), a portable electric tool (e.g., cordless tool), and/or any other mobile or portable device. The electronic device may also be referred to herein as a buoyant device, a buoyant portable device, and/or a buoyant mobile device.

The electronic device 100 implements the present solution. The present solution provides a means to protect users from losing the electronic device 100 when dropped or otherwise disposed in a body of liquid (e.g., a swimming pool, lake, river or sea). The unique structure of the electronic device 100 creates a buoyant force such that the electronic device floats to the liquid's surface horizontally. In effect, the user can easily see find and collect the electronic device 100 from the body of liquid. The unique structure also causes the body of liquid to create a relatively large upward buoyant force to (i) prevent mechanical damage to the electronic device 100 which could result from hitting a bottom surface, (ii) prevent the electronic device 100 from sinking to the bottom surface, and/or (iii) raise the electronic device 100 quickly to the liquid's surface. Buoyancy of the electronic device 100 ensures that components (e.g. vents and circuitry) of the electronic device 100 are not damaged due to liquid pressures in any type of body of liquid.

The electronic device 100 is designed to be at least partially submersed in liquid without any damage to the internal electronic components. The electronic components can include, but are not limited to, display(s) 104, microphone(s) 110, camera(s) 114, 302, speaker(s) 128, connector(s) 106, button(s) 202-208, communication circuit(s) 114, light(s) 304 (e.g., cameral flash and/or light emitting diodes), sensor(s) 306 (e.g., biometric sensor(s) and/or camera sensor(s)), power source(s) (e.g., rechargeable battery) and/or computing device(s). The electronic components are housed in a housing 102 of the electronic device 100. The housing 102 can comprise any suitable material such as plastic, metal, and/or rubber.

Apertures 116, 118, 120, 122, 124, 126 are formed in the housing 102 whereby at least some of the electronic components are at least partially exposed. For example, the display 104 is disposed in and/or adjacent to aperture 120.

A receiver 114 is disposed in and/or adjacent to aperture 116. A camera 112 is disposed in and/or adjacent to aperture 118. A microphone is disposed in and/or adjacent to aperture 126, and a speaker 128 is disposed in and/or adjacent to apertures 124. Apertures 124 can comprise vents for the speaker 128. A connector 106 is disposed in and/or adjacent to aperture 122. An environmental, liquid-tight and/or hermetic seal is provided between the housing 100 and each of the electronic components that reside in and/or adjacent to the apertures 116-126. Any known or to be known sealing means can be used to provide the seals. The sealing means can include, but are not limited to, gasket(s), adhesive(s), epoxy(ies), rubber(s), membrane(s), glue(s), USB port jacket(s), stub(s), liquid tight mesh adhesive(s), and/or weld(s).

The electronic device 100 can include an internal rechargeable battery. The battery can be recharged via connector 106. Connector 106 can mate with (i) a connector of a cord designed to be plugged into a wall socket and/or (ii) a connector of a docking station. The battery can additionally or alternatively be recharged via inductive charging. The battery can include, but is not limited to, graphene-based battery(ies) such as pure graphene battery(ies), graphene foam, graphene-metal oxide hybrid battery(ies), flexible graphene battery(ies) and/or graphene composite battery(ies). A graphene-based battery is lighter and slimmer than conventional batteries such as lithium-ion batteries. As such, the graphene-based battery(ies) facilitate(s) a reduction in an overall weight and thickness of the electronic device 100 thus improving buoyancy of the electronic device.

Figure 17:
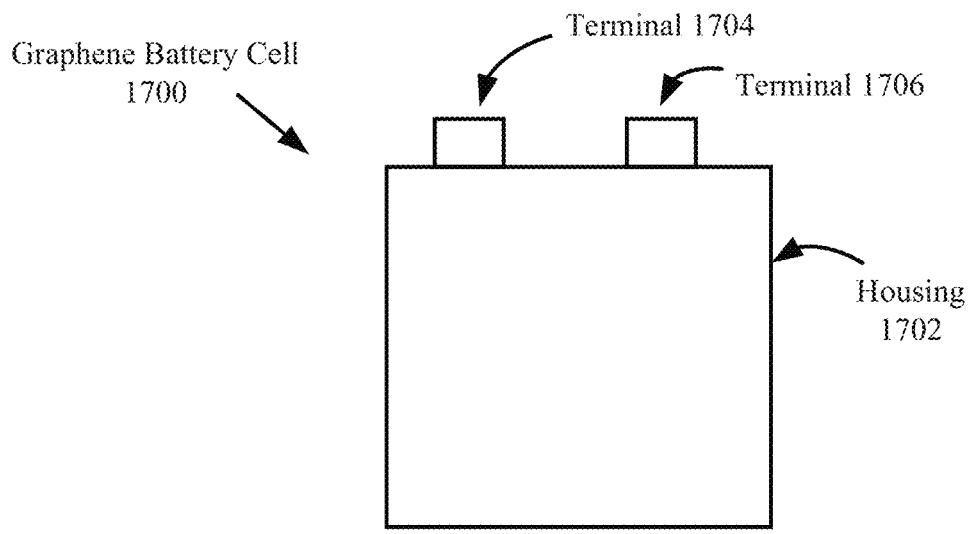
FIGS. 17-20 provide illustrations of graphene battery(ies).
Figure 18:
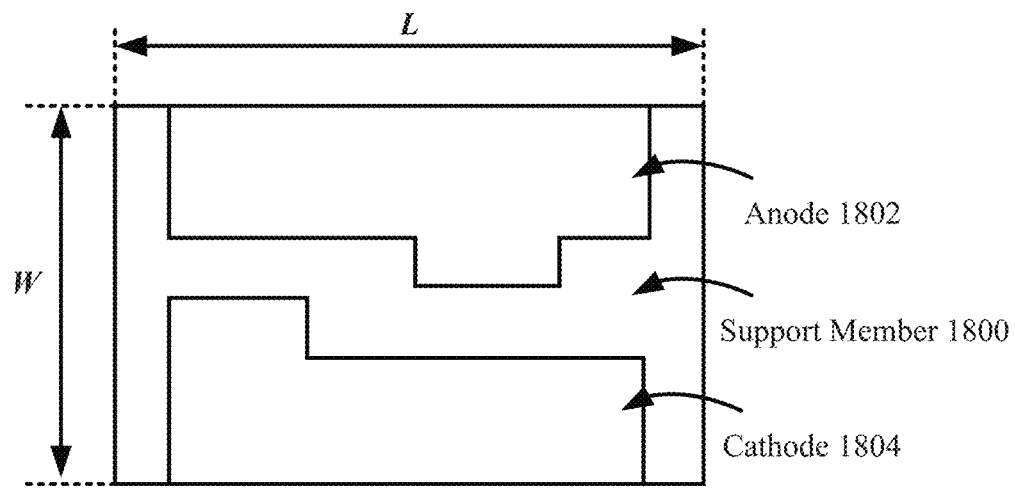
Figure 19:
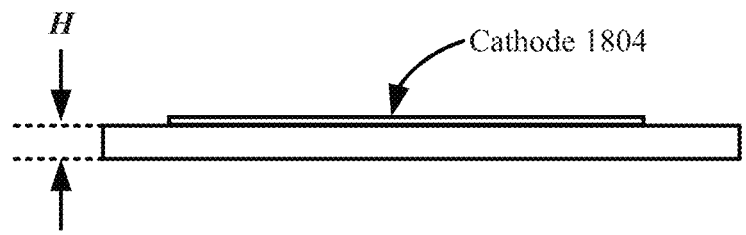
Figure 20:
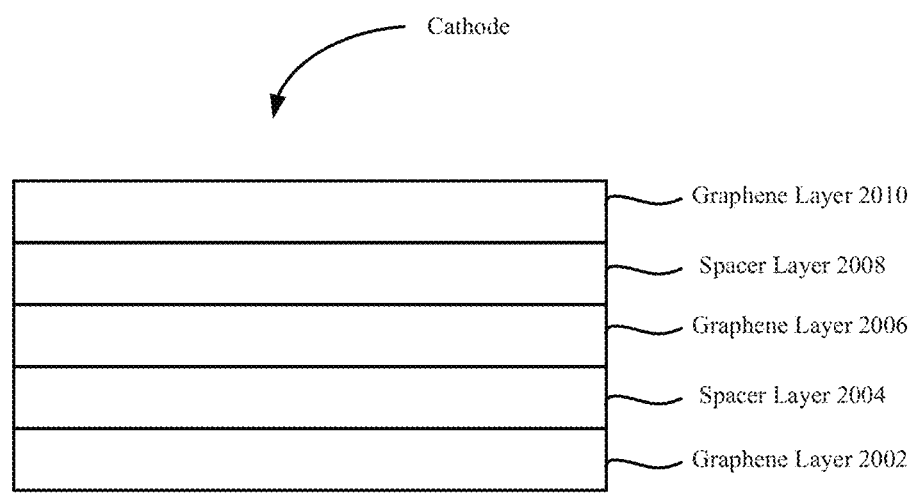

An illustrative graphene-based battery 1700 is shown in FIGS. 17-19. The graphene-based battery 1700 comprises a housing 1702 with two terminals 1704, 1706 extending therefrom. Two electrodes 1802, 1804 are disposed inside the housing 1704 along with an electrolyte to facilitate ion transfer. Terminal 1704 is connected to an anode 1802 and terminal 1706 is connected to a cathode 1804. The electrodes 1802, 1804 are supported by a support member 1800. The support member 1800 can be formed of plastic, reinforced plastic, polyester (e.g., polyethylene terephthalate (PET)), or other non-conductive material. At least the cathode 1804 is comprised of a composite-hybrid material containing a solid-state metallic material and graphene. The solid-state metallic material includes, but is not limited to, lithium ion, lithium sulfur, and/or lithium metal. The graphene facilitates longer charge retention by the battery 1700 and a longer life span of the battery. The graphene can be implemented as a single graphene sheet as shown in FIGS. 17-19 or a plurality of graphene sheets 2002, 2006, 2010 having a stacked arrangement as shown in FIG. 20. In the latter case, the cathode may additionally comprise spacing layers 2004, 2008 (e.g., carbon nanotubes and/or fullerenes) in between the graphene sheets to increase spacing therebetween. The increased spacing between graphene sheets provides extra cavities for solid-state metallic material to occupy, thereby increasing the capacity of the battery. The electrolyte can include, but is not limited to, a polymer electrolyte and/or other high conductivity material. The electrolyte can be in a semisolid (e.g., gel) or solid form. The battery has a length L, width W and height H. For example, in portable phone scenarios, the battery has a length L between 75-95 mm, a width W between 55-75 mm, and a height H between 3-6 mm. These dimensions were not simply design choices. Significant research was performed to obtain ranges for L, W and H that would allow for buoyancy of the portable phone while providing suitable battery performance and lifecycle. The present solution is not limited to the particulars of this example.

The buttons 202-206 can facilitate user control of certain parameters of the electronic device 100. For example, button 202 allows user-software interactions for decreasing speaker volume, while button 204 allows user-software interactions for increasing speaker volume. Button 206 allows user-software interactions for turning on and off the electronic device 100 and/or light 304. Button 208 facilitates ejection of a smart card (e.g., a SIM card). The smart card can comprise a unique identifier and/or other information associated with the user of the electronic device 100. The electronic device is prevented from turning on or otherwise operating when the smart card is removed therefrom.

Figure 4:
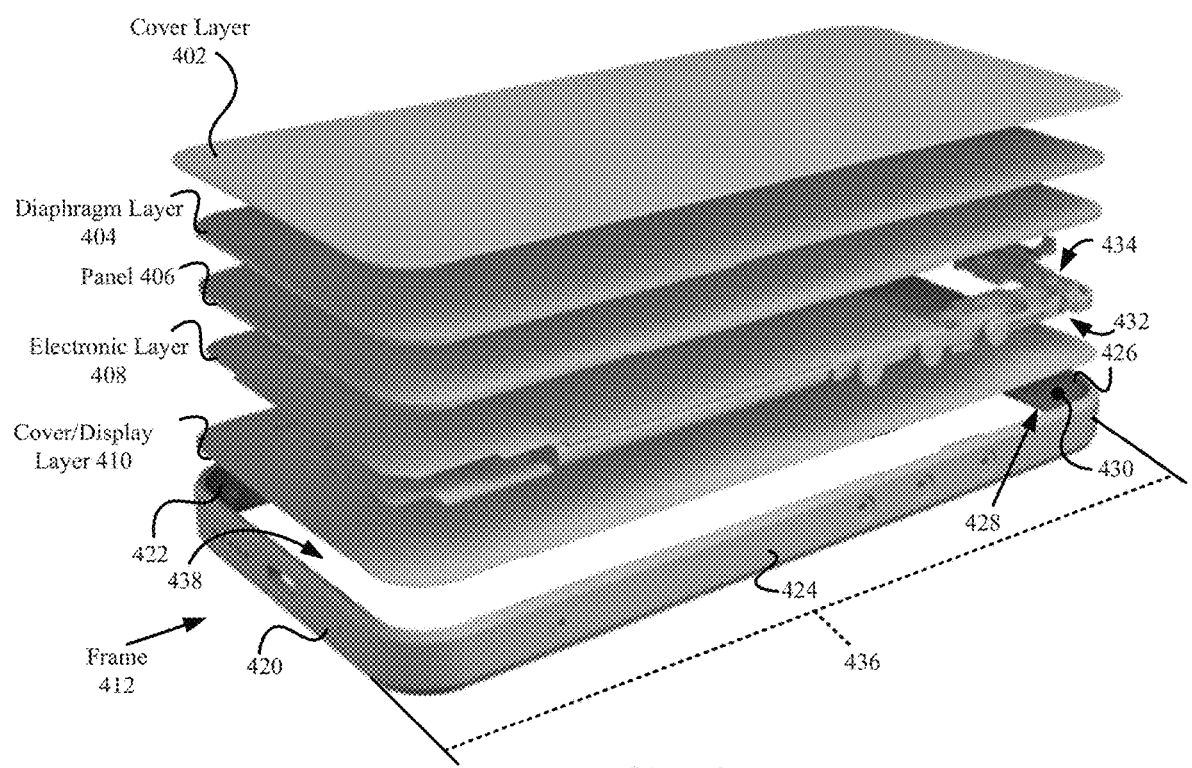
FIG. 4 provides an exploded view of the electronic device shown in FIG. 1.
Figure 5:
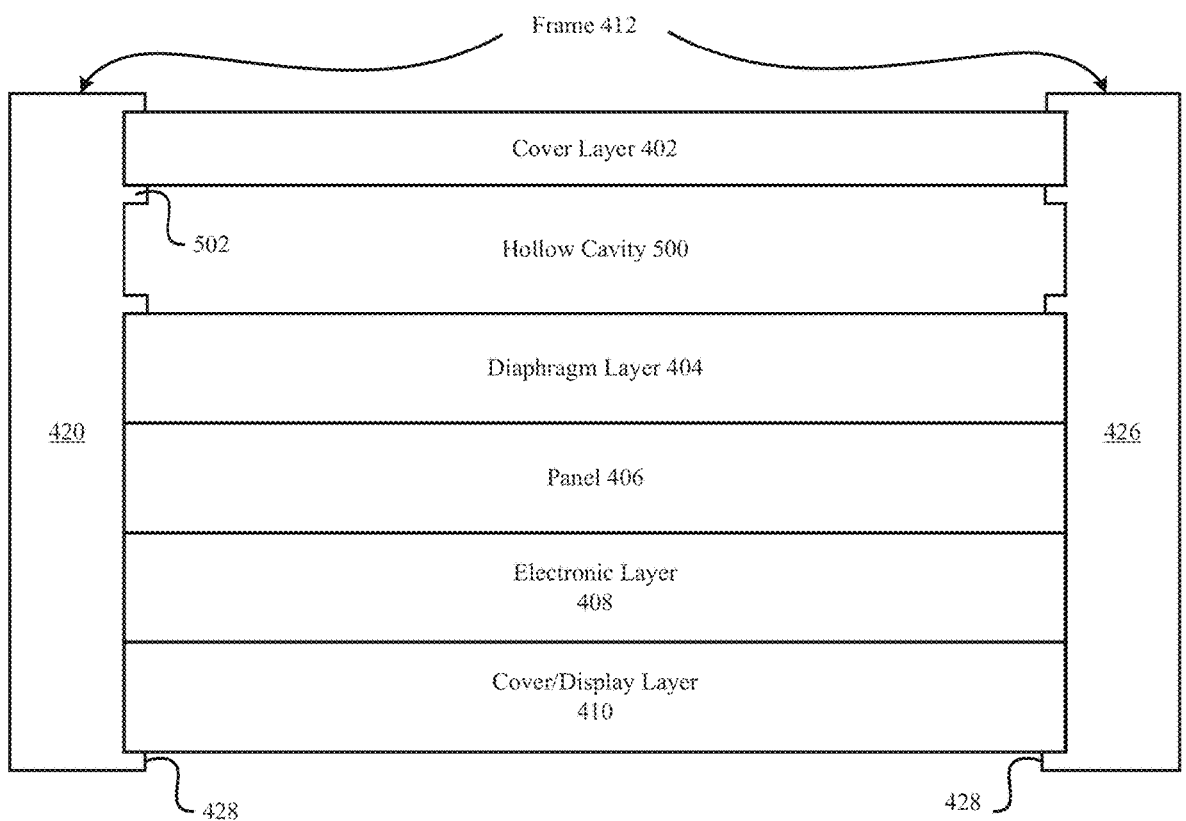
FIG. 5 provides an illustration showing a stacked arrangement of the layers of the electronic device shown in FIGS. 1-4.

An exploded view of the electronic device 100 is provided in FIG. 4. As shown in FIG. 4, the electronic device 100 comprises a plurality of layers 402-410. When assembled, the layers 404-410 have a closely (or densely) packed (or spaced), stacked arrangement as shown in FIG. 5. The housing 102 comprises cover layers 402, 410 and a frame 412. The terms "closely packed", "closely spaced", "densely packed" or "densely spaced" as used herein each mean two objects are directly in contact with each other or adjacent to each other with no gap or a relatively small gap therebetween. The relatively small gap can include, but is not limited to, a gap with a height of ≤0.5 mm. Frame 412 is provided to structurally support and maintain layers 402-410 in the closely (or densely) packed, stacked arrangement. In this regard, frame 412 comprises a plurality of sidewalls 420-426 with top and bottom flanges 428 configured to respectively engage cover layers 402, 410 and prevent the cover layers 402, 410 from dislodging from the frame 412. An environmental, liquid-tight and/or hermetic seal is provided between the cover layers 402, 410 and the top and bottom flanges 428. Any known or to be known sealing means can be used to provide the seals. The sealing means can include, but are not limited to, gasket(s), adhesive(s), epoxy(ies), rubber(s), and/or weld(s).

Layers 404-408 reside between the cover layers 402, 410 and are therefore also referred to herein as intermediate layers. The intermediate layers include a diaphragm layer 404, a panel 406, and an electronic layer 408. The sidewalls 420-426 are also sized and shaped to prevent layers 404-408 from sliding out of the frame 412 and to maintain a given spacing between layers 402 and 404. The spacing is maintained, for example, using structural support member(s) 502 which protrude(s) out from the frame 412 in a direction towards a center of the electronic device 100. The spacing causes a hollow cavity 500 to be provided between layers 402, 404 as shown in FIG. 5.

The hollow cavity 500 is provided to facilitate buoyancy of the electronic device 100. In this regard, the hollow cavity 500 is (i) filled with air (or other fluid) and (ii) sized and shaped to provide an overall density of the electronic device 100 that is below a density of liquid that the electronic device displaces when disposed therein. The hollow cavity 500 comprises a given percentage of the total volume of the electronic device 100. This percentage can include, but is not limited to, 5%, greater than 5%, any number between 5% and 10%, any number between 5% and 15%, any number between 5% and 25%, 10%, 15%, and/or 25%. The density of air is 0/001293 gm/cc. When the electronic device 100 is disposed in liquid, the hollow cavity 500 causes the body of liquid to create an upward buoyant force sufficient to allow the electronic device 100 to float to and on the liquid's surface.

The frame 412 can comprise any material selected in accordance with a given application. For example, in some scenarios, the frame 412 comprises a plastic material over molded to a midframe. The plastic over mold allows antenna(s) to pass through the frame 412 without any communication disruption and to hold electronics in the enclosed area of the housing 102. The plastic material can have a density selected in accordance with a given application (e.g., less than or equal to 1 gm/cc). The midframe can comprise aluminum (e.g., 2.7 gm/cc), magnesium, aluminum alloy, magnesium alloy (e.g., 1.8 gm/cc), magnesium aluminum alloy and/or any other suitable material (e.g., plastic and/or composite material). The present solution is not limited to the particulars of this example.

The frame 412 is also designed to have a uniform thickness or a non-uniform thickness depending on a particular application. In the non-uniform scenarios, detent(s), protrusion(s) and/or aperture(s) is(are) formed on at least one sidewall of the frame 412 to facilitate a balanced distribution of weight in the electronic device 100. For example, the electronic layer 408 may have an unbalanced distribution of weight in a horizontal plane and/or vertical plane of the electronic device 100. As such, one or more detents, protrusions and/or apertures 430 is(are) formed in at least one sidewall of the frame 412 to offset the unbalanced distribution of weight of the electronic layer 408. The present solution is not limited to the particulars of this example. The non-uniform thickness of the frame can be provided via other ways (e.g., using a mold that produced the same).

Figure 14:
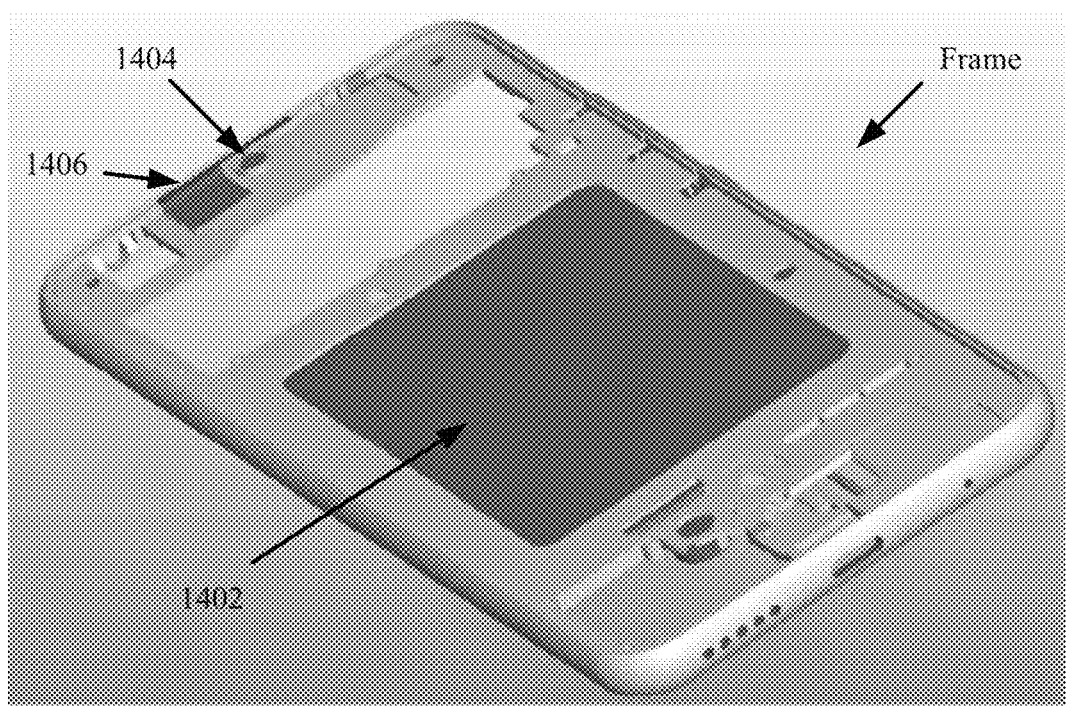
FIGS. 14-15 provide more detailed illustrations of the mid-frame for the electronic device with certain electronic components disposed on or adjacent thereto.
Figure 15:
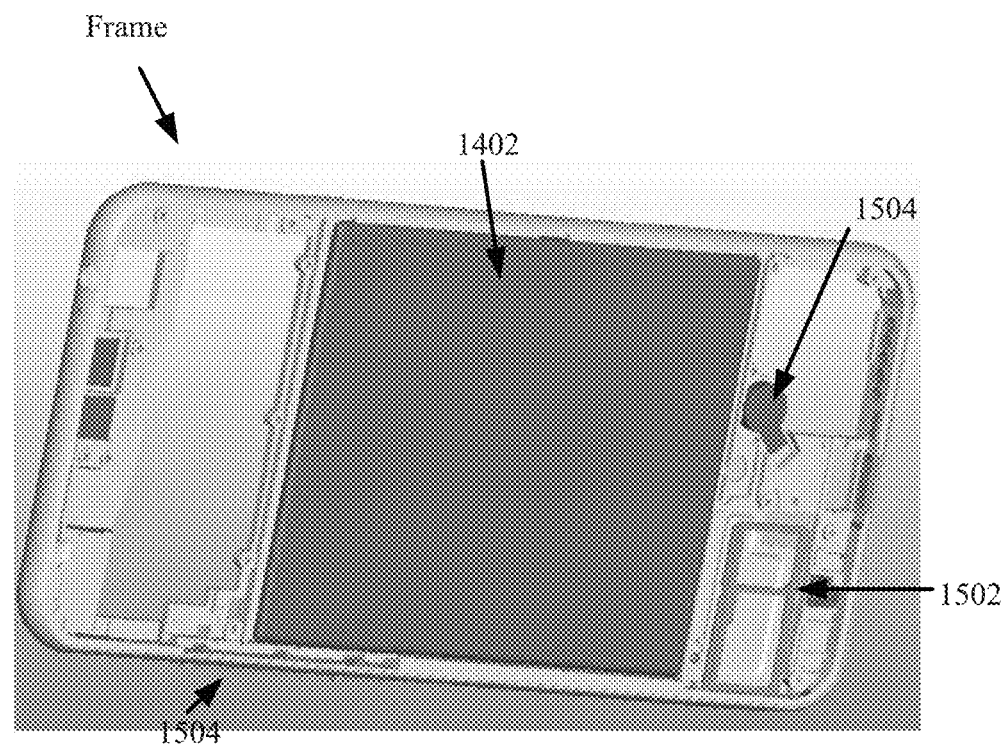

Another architecture for a frame is provided in FIGS. 14-15. As shown in FIGS. 14-15, the frame can be designed to receive and structurally support the battery 1402 and various electronic components (e.g., camera(s) 1404, receiver(s) 1406, tactile feedback devices 1504, smart card(s) 1502, and/or plate(s) 1504) of the electronic device.

The cover layer 402 generally comprises a planar sheet of material. The material can include, but is not limited to, plastic(s), glass, polycarbonate(s), carbon fiber(s), air alloy(s), aerogel(s), carbon nanotube(s), nylon, Acrylonitrile Butadiene Styrene (ABS), and/or any other material with a density equal to or less than a liquid (e.g., ≤one gram per cubic centimeter (1 gm/cc) which is the density of water). The material can be scratch resistant. It should be noted that the rear cover layer of conventional mobile phones is typically formed of a thermoplastic material that has a density (e.g., 1.12 gm/cc to 1.2 gm/cc) greater than the density of water (i.e., 1 gm/cc). In contrast, the cover layer 402 of electronic device 100 is formed of a material with a density equal to or less than a liquid (e.g., ≤one gram per cubic centimeter (1 gm/cc) which is the density of water). This feature of the present solution facilitates buoyancy of the electronic device 100.

Figure 6:
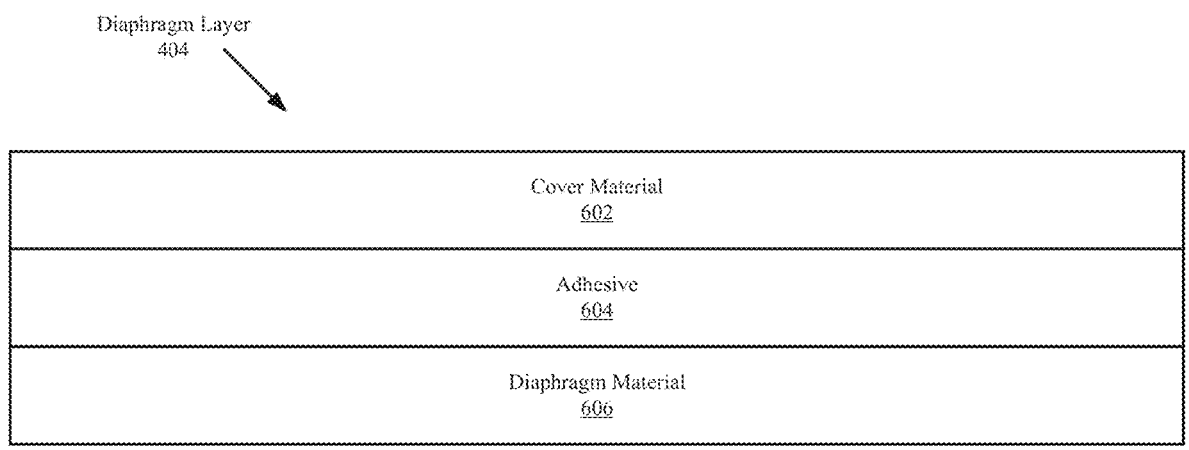
FIG. 6 provides a more detailed illustration of the diaphragm layer of the electronic device.

A more detailed illustration of the diaphragm layer 404 is provided in FIG. 6. As shown in FIG. 6, the diaphragm layer 404 comprises two layers 602, 606 coupled to each other via a coupling means 604. Layer 602 can include, but is not limited to, a planar sheet of plastic and/or other cover material. Layer 606 can include, but is not limited to, a diaphragm material (e.g., a semi-flexible sheet of plastic). The coupling means 604 can include, but is not limited to, adhesive(s) and/or other bonding material (e.g., a lamination material).

The panel 406 comprises a sheet of material to maintain a spacing between the electronic layer 408 and the diaphragm layer 404 such that the shape and size of the hollow cavity 500 are fixed. The sheet of material can include, but is not limited to, plastic.

Figure 7:
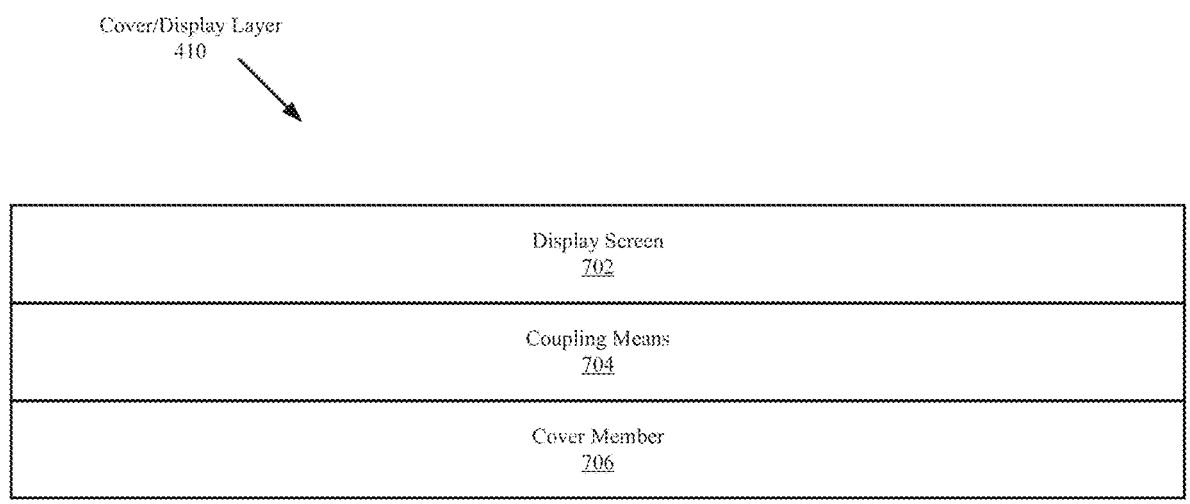
FIG. 7 provides a more detailed illustration of the cover/display layer of the electronic device.
Figure 8:
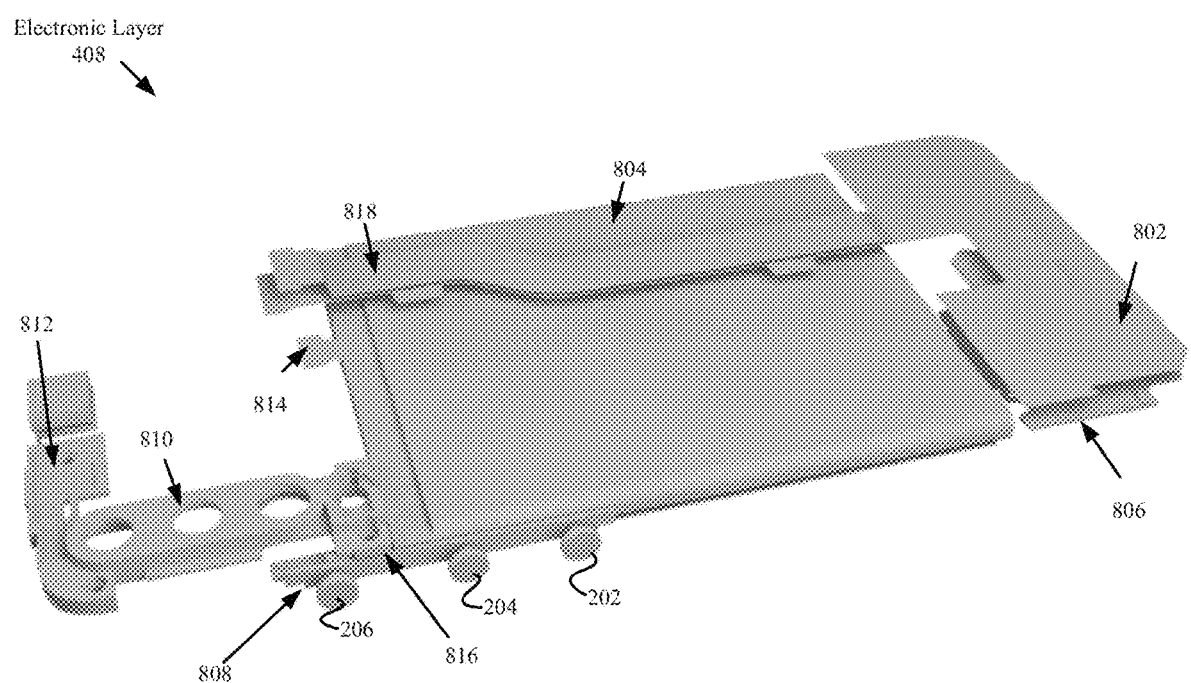
FIGS. 8-10 provide more detailed illustrations of the electronic layer of the electronic device with circuit board(s) not shown for ease of illustration.
Figure 9:
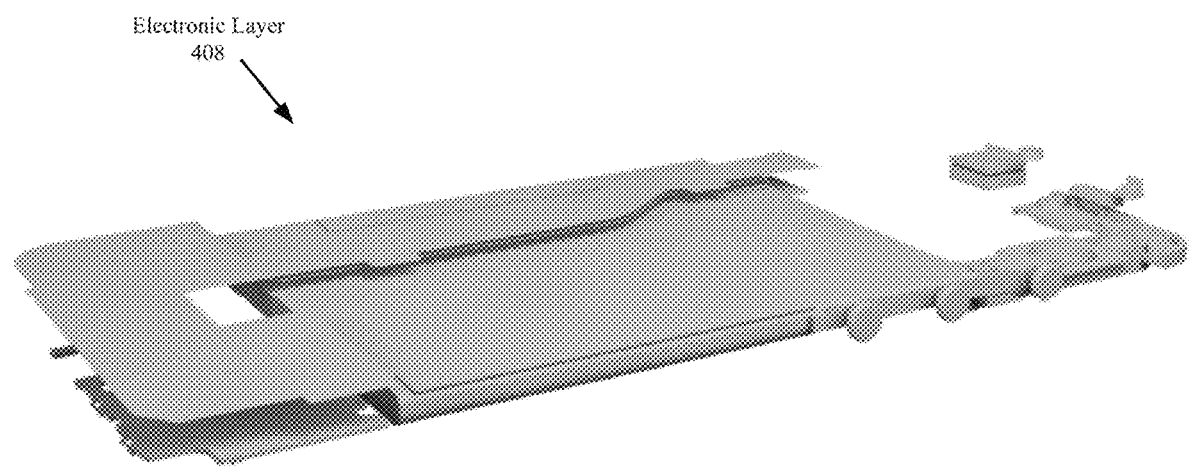
Figure 10:
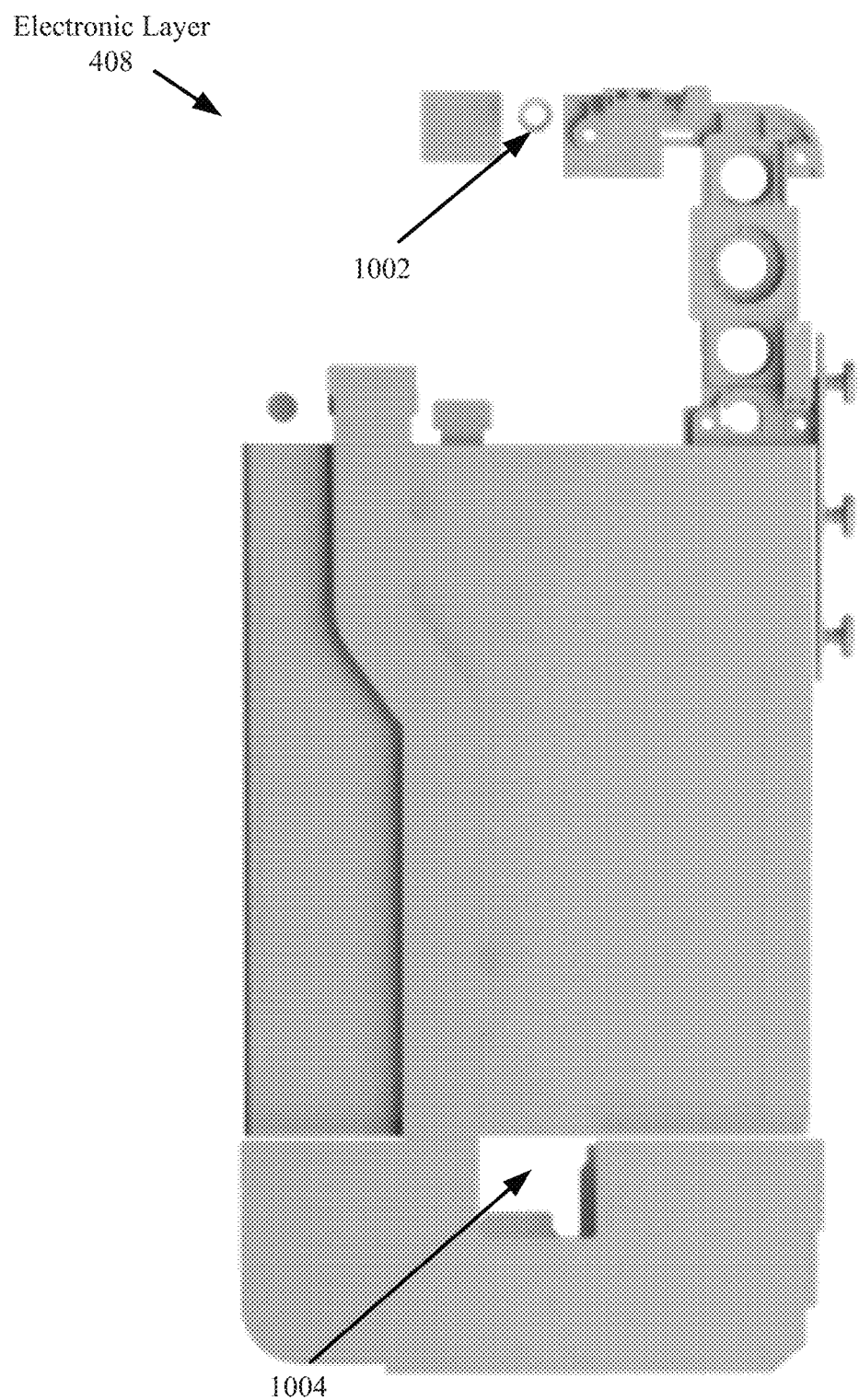
Figure 11:
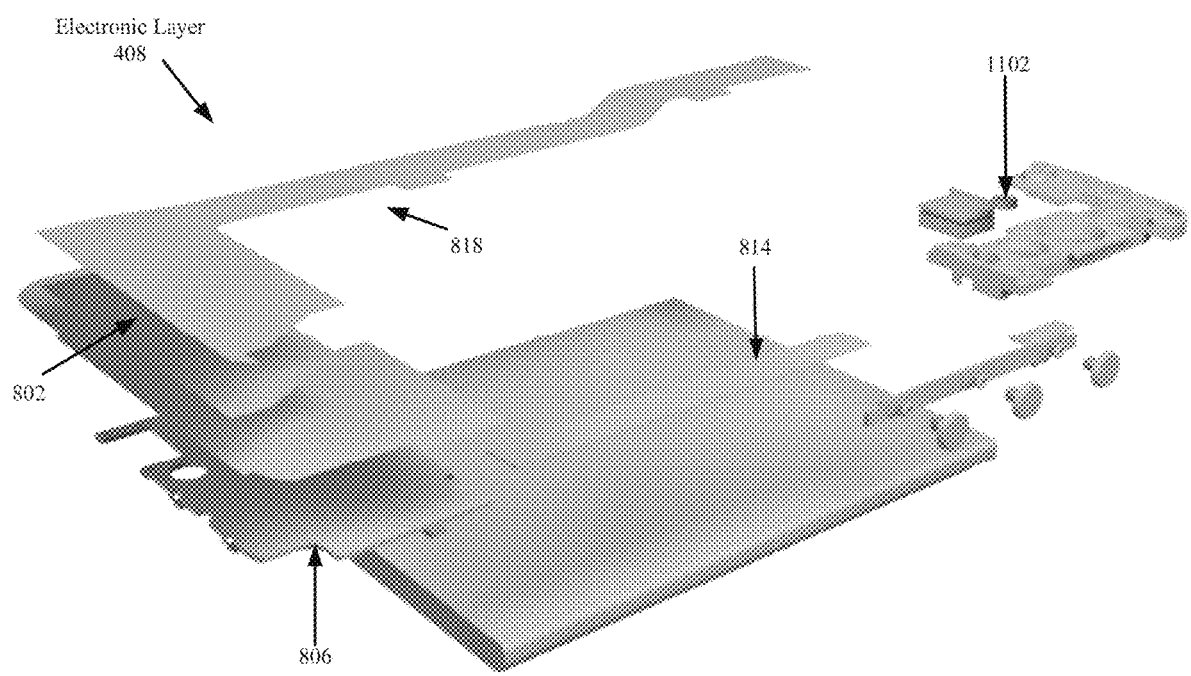
FIG. 11 provides an exploded view of the electronic layer with circuit board(s) not shown for ease of illustration.
Figure 12:
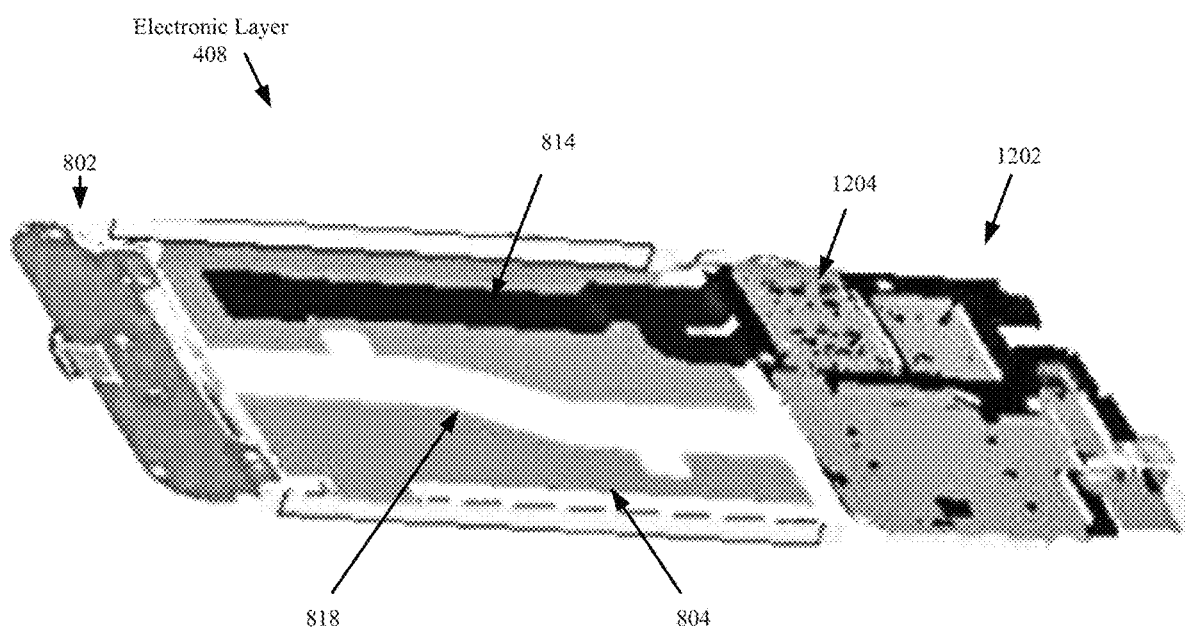
FIG. 12 provides an assembled view of the electronic layer with the circuit boards shown.

A more detailed illustration of cover/display layer 410 is provided in FIG. 7. The cover/display layer 410 comprises a planar cover member 706 coupled to a display screen 702 via a coupling means 704. The coupling means 704 can include, but is not limited to, adhesive(s) and/or other bonding material (e.g., a lamination material). The planar cover member 706 can include, but is not limited to, glass (e.g., tempered glass and/or shatter resistant laminated glass), plastic, shatter resistant film, and/or other transparent material. The planar cover member 706 may include, but is not limited to, a piece of relatively thin glass with a layer of nano-fluid rubbed thereon for increasing its strength. The nano-fluid comprises nano-particles suspended in the fluid which can be dispensed via a dropper tool. The display screen 702 can include, but is not limited to, a touch screen display, flexible display screen, a rollable screen, a bendable display screen, and/or a waterproof display screen. The display screen 702 can have a flat or curved cross-sectional profile.

The cover/display layer 410 can have a thickness selected in accordance with a given application. For example, in some scenarios, the thickness of the cover layer is between 0.2 mm and 0.9 mm, 0.2 mm and 0.8 mm, 0.2 mm and 0.7 mm, 0.2 mm and 0.6 mm, 0.2 mm and 0.5 mm, 0.2 mm and 0.4 mm, 0.2 mm and 0.3 mm, 0.3 mm and 0.8 mm, 0.3 mm and 0.7 mm, 0.3 mm and 0.6 mm, 0.3 mm and 0.5 mm, and/or 0.3 mm and 0.4 mm (inclusive of end points). The present solution is not limited to the particulars of this example. This relatively thin thickness facilitates buoyancy of the electronic device 100.

In conventional electronic devices solutions, the batteries are the heaviest component and the display is the second heaviest component thereof. The batteries are typically placed at a location within the electronic devices that is offset from a center of the electronic devices and relatively close to the front of the electronic device along with the display. Thus, the electronic devices do not have a balanced distribution of weight in the horizontal and/or vertical planes. In effect, the display screen of conventional electronic devices typically points in a downwards and/or angled direction (relative to the water's surface) when the electronic device is disposed in water. Consequently, it is difficult to locate the electronic devices in the body of water.

The present solution has been designed to address these drawbacks of conventional electronic devices. In this regard, the battery of the electronic device 100 can include graphene-based battery(ies) such as pure graphene battery(ies), graphene foam, graphene-metal oxide hybrid battery(ies), graphene composite battery(ies) and/or flexible graphene battery(ies). A graphene-based battery is lighter and slimmer than conventional batteries such as lithium-ion cells. As such, the graphene battery facilitates a reduction in an overall weight and thickness of the electronic device 100. The electronic device 100 is designed such that it has a balanced distribution of weight in at least the horizontal plane (i.e., the plane extending parallel to axis 1610 of FIG. 16). The cover/display layer 410 of the present solution is designed to have an overall weight (e.g., 20-21 grams) less than the combined weight of frame 412 and cover layer 402, less than a combined weight of frame 412 and layers 402-406, and/or less than the combined weight of frame 412 and layers 402-408. In some scenarios, the cover/display layer 410 comprises a graphene-based display. The graphene-based display is lighter and slimmer than conventional displays. These features of the present solution facilitate buoyancy of the electronic device 100 and the horizontal floating of the electronic device in liquid with the cover/display layer 410 pointing in an upwards direction.

The electronic layer 408 comprises circuit components of the electronic device. The circuit components can include, but are not limited to, antenna(s), circuit boards, speaker(s), power source(s) (e.g., rechargeable battery(ies) and/or energy harvester), and/or connectors. The circuit components are designed and engineered with low density materials. The electronic layer can have an overall weight selected in accordance with a particular application. For example, in some scenarios, electronic layer 408 has a weight of 25-26 grams (inclusive of 25 and 26 grams). The present solution is not limited to the particulars of this example.

Figure 16:
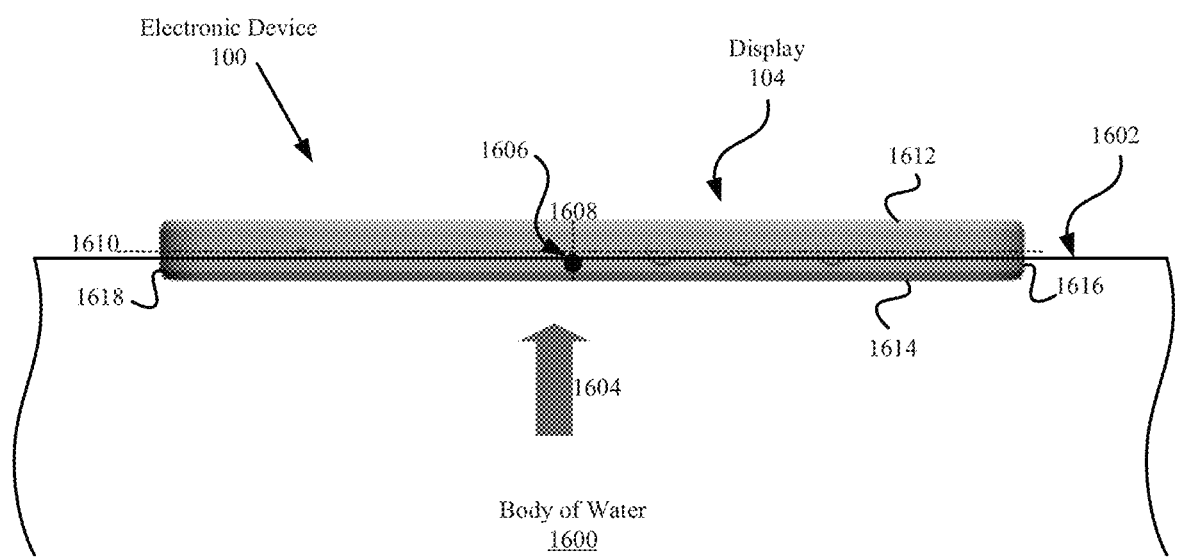
FIG. 16 shows the electronic device floating in a body of liquid (e.g., water).

For balanced floatation, the frame 412 and electronic layer 408 are designed to provide the electronic device 100 with a distributed weight in at least the horizontal plane (i.e., the plane extending parallel to axis 1610 of FIG. 16). The weight of the electronic layer 408 can be balanced or unbalanced in the horizontal plane. In the balanced scenarios, the frame 412 may be absent of detent(s)/protrusion(s)/aperture(s) 430. Detent(s)/protrusion(s)/aperture(s) 430 may be provided when the electronic layer 408 has an unbalanced distributed weight in the horizontal plane and/or vertical plane (i.e., the plane extending parallel to axis 1608 of FIG. 16).

More detailed illustrations of the electronic layer 408 are provided in FIGS. 8-12. As shown in these drawings, the electronic layer 408 comprises a circuit board 802, 1202 placed adjacent to each end of a battery 804. Battery 804 can be vertically offset from or at least partially vertically aligned with one or more of the circuit board 802, 1202. Battery 804 can include, but is not limited to, a graphene battery. In conventional mobile phones, the battery resides in a layer behind another layer comprising an elongate circuit board that extends the entire length of an internal cavity of the mobile phone. In contrast, the battery 804 of electronic device 100 resides in the same layer as circuit boards 802, 1202, and is located between two or more spaced apart circuit boards (which each extend only a portion of the length 436 of the internal cavity 438 of the electronic device 100). This battery/circuit board configuration is at least made possible due to the decreased overall size and/or thickness of the battery as compared to that of conventional mobile phones. The battery/circuit board configuration facilitates a balanced weight distribution of electronic components within the electronic layer 408.

Circuit board 1202 is structurally supported by structure 812 and connected to the battery via connector 814. Circuit boards 802, 1202 are connected to each other via connector 818. A support structure 1002 is provided for front camera 112, and a support structure 810 is provided for back camera 302. The light 304 and sensor 306 are structurally supported by structure 816. Buttons 202-206 are structurally supported by plate 808. Plate 808 also facilitates an electrical connection between button 206 and circuit board(s) 802, 1202 so that the button can be used to turn on/off the electronic device 100. A speaker circuit 806 is also provided in the electronic layer 408. Plate 808 also facilitates an electrical connection between buttons 202, 204 and the speaker circuit 806 so that the buttons can be used to change the volume and/or other parameters of the speaker 128. An insert space 1004 is provided for sensor(s). The sensor(s) can include, but is(are) not limited to, biometric sensor(s) (e.g., fingerprint sensor).

Circuit boards 802, 1202 can have device(s) 1204 mounted thereto and connected to each other via conductive traces. The device(s) 1204 can include, but are not limited to, communication device(s) and/or computing device(s). The communication device(s) can be configured to facilitate Near Field Communications (NFCs), Short Range Communications (SRCs) and/or Long Range Communications (LRCs). The computing device(s) can include, but are not limited to, datastore(s), processor(s), data bus(es), input device(s), output device(s), removable smart card(s), tactile feedback device(s) (e.g., visual, auditory, and/or tactile), sensor(s), transceiver(s), and/or antenna(s).

As noted above, the electronic device 100 is configured for stable horizontal floatation in a body of liquid. For the stable horizontal floatation, the display screen 702 along with the cover member 706 are designed to weigh less than combined weight of the frame 412 and at least layer 402. In this regard, the display screen 702 can include, but is not limited to, a graphene-based display or a cover (e.g., glass sheet) backed with a display (e.g., a Liquid Crystal Display (LCD) screen, an Organic Light Emitting Diode (OLED) display screen, flexible-OLED display screen, plastic OLED display screen, graphene display screen or other type of display screen). The display can be attached to the cover via lamination or adhesive. The cover may include, but is not limited to, a piece of relatively thin glass with a layer of nano-fluid rubbed thereon for increasing its strength. The nano-fluid comprises nano-particles suspended in the fluid which can be dispensed via a dropper tool. Graphene-based displays are lighter and thinner than displays used in conventional portable electronic devices. For balanced floatation, the electronic layer 408 is designed to have the electronic components located therein to provide a balanced distributed weight at least across a horizontal plane thereof.

The frame 412 is also designed to have a uniform thickness or a non-uniform thickness depending on a particular application. In the non-uniform scenarios, detent(s)/protrusion(s)/aperture(s) 430 are formed in the frame 412 to facilitate a balanced distribution of weight in the electronic device 100. The buoyant force caused by the electronic device structure allows the lighter component of the device (i.e., the cover/display layer 410) to face upwards and the heavier component(s) (e.g., layer(s) 402-408) to face downwards when the electronic device is floating in a body of liquid.

The following factors should be considered for buoyancy: total weight of an electronic device and total volume of an electronic device. Density is the quantity of mass per unit volume of a substance. The density of an electronic device determines whether it floats or sinks in the body of liquid. The electronic device floats when it has a lower density to that of water, and sinks in water when it has higher density to that of water. The density of water is 1000 kg/m³ (1 gm/cc). Device density can be decreased by reducing mass and/or increasing volume. For buoyancy, the density of the electronic device 100 can be selected to be less than 950 kg/m³ (0.95 gm/cc) in some applications. The present solution is not limited in this regard.

The following chart shows the weight, dimensions and density to achieve floatation for an electronic device having 100 gm in total weight.

| Weight in gm. | Length in mm | Breadth in mm | Height in mm | Density in kg/m^3 | Density of water |
|---|---|---|---|---|---|
| 100 | 155 | 80 | 7.5 | 1075.268817 | 1000 |
| 100 | 155 | 80 | 7.6 | 1061.120543 | 1000 |
| 100 | 155 | 80 | 7.7 | 1047.339757 | 1000 |

-continued

| Weight in gm. | Length in mm | Breadth in mm | Height in mm | Density in kg/m^3 | Density of water |
|---|---|---|---|---|---|
| 100 | 155 | 80 | 7.8 | 1033.912324 | 1000 |
| 100 | 155 | 80 | 7.9 | 1020.824826 | 1000 |
| 100 | 155 | 80 | 8 | 1008.064516 | 1000 |
| 100 | 155 | 80 | 8.1 | 995.6192752 | 1000 |
| 100 | 155 | 80 | 8.2 | 983.4775767 | 1000 |
| 100 | 155 | 80 | 8.3 | 971.6284493 | 1000 |
| 100 | 155 | 80 | 8.4 | 960.0614439 | 1000 |
| 100 | 155 | 80 | 8.5 | 948.7666034 | 1000 |
| 100 | 155 | 80 | 8.6 | 937.7344336 | 1000 |
| 100 | 155 | 80 | 8.7 | 926.9558769 | 1000 |
| 100 | 155 | 80 | 8.8 | 916.4222874 | 1000 |
| 100 | 155 | 80 | 8.9 | 906.1254078 | 1000 |

As shown in the above chart, an electronic device with a weigh to 100 gm can be made buoyant by selecting a length of 155 mm, a breadth of 80 mm, and a height equal to or greater than 8.1 mm. Buoyancy increases as the height of the electronic device increases. The present solution is not limited in this regard since the calculations will vary when the weight and dimensions are different from the above example.

Figure 13:
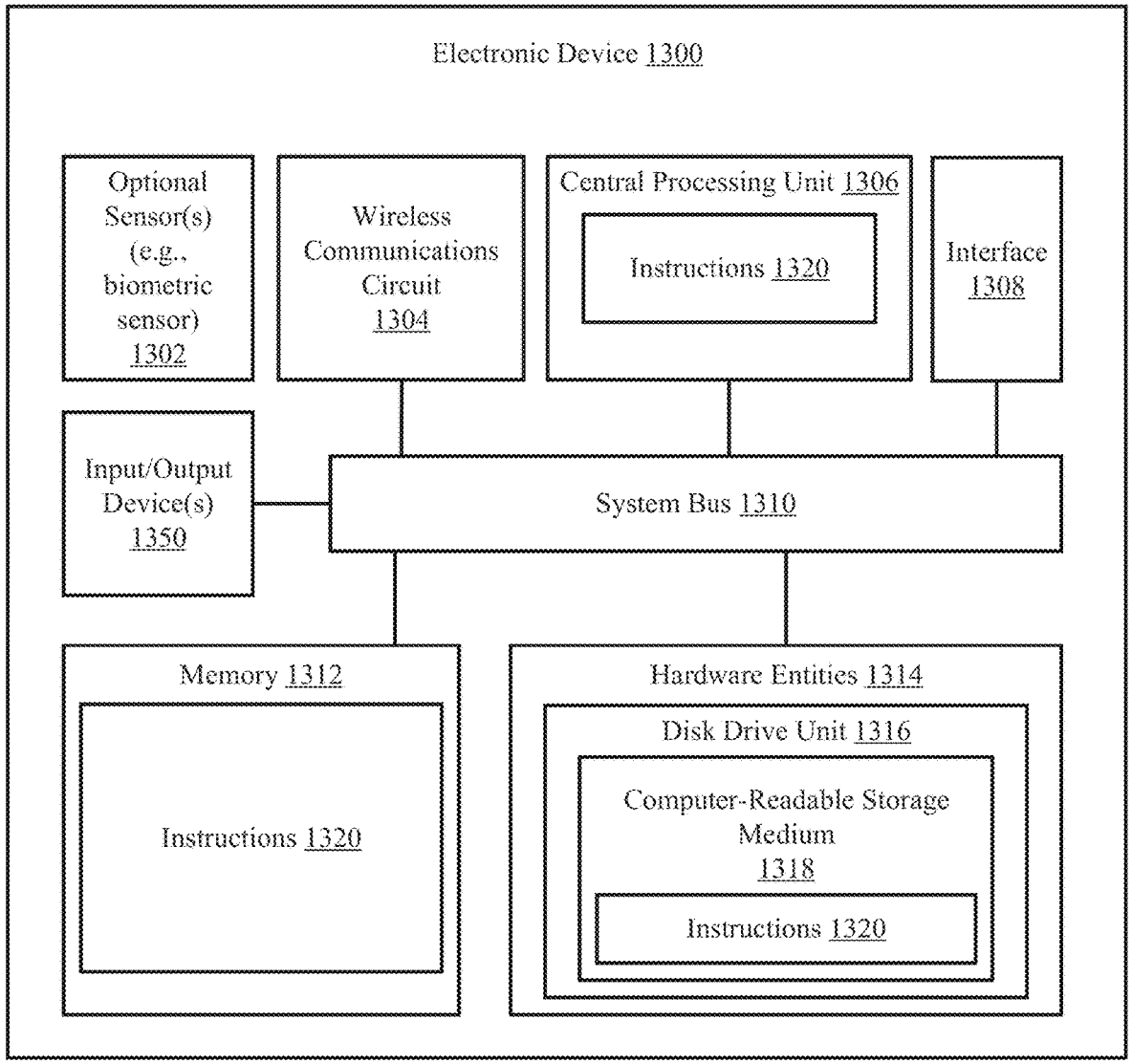
FIG. 13 is a block diagram of an illustrative electronic device.

Referring now to FIG. 13, there is provided a detailed diagram of an electronic device 1300. Electronic device 100 of FIG. 1 and/or device(s) 1204 of FIG. 12 can be the same as or substantially similar to electronic device 1300. As such, the discussion of electronic device 1300 is sufficient for understanding electronic device 100 of FIG. 1 and/or device(s) 1204 of FIG. 12.

Electronic device 1300 may include more or less components than those shown in FIG. 13. However, the components shown are sufficient to disclose an illustrative solution implementing the present invention. The hardware architecture of FIG. 13 represents one implementation of a representative electronic device configured to enable wireless communications to/from remote devices. As such, the electronic device 1300 of FIG. 13 implements at least a portion of the method(s) described herein.

Some or all the components of the electronic device 1300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The electronic device 1300 can include, but are not limited to, optional sensor(s) 1302, a wireless communications circuit 1304, a Central Processing Unit (CPU) 1306, an interface 1308, a system bus 1310, a memory 1312 connected to and accessible by other portions of electronic device 1300 through system bus 1310, and hardware entities 1314 connected to system bus 1310.

The sensor(s) 13202 can include, but are not limited to, biometric sensors, a GPS sensor, a microphone, and/or a motion sensor. The wireless communications circuit 1304 is configured to facilitate wireless communications with external devices. In this regard, circuit 1304 comprises a transceiver. Transceivers are well known in the art, and therefore will not be described herein. Any known or to be known transceiver can be used herein without limitation. In some scenarios, the transceiver is an RF transceiver. The interface 1308 provides a means for electrically connecting the electronic device 1300 to Input/Output (I/O) circuits and antennas. The I/O circuits can include, but are not limited to, an audio circuit, a data/control circuit, and/or a power supply circuit (e.g., a battery or battery charger).

At least some of the hardware entities 1314 perform actions involving access to and use of memory 1312, which can be a Random Access Memory (RAM), and/or a disk driver. Hardware entities 1314 can include a disk drive unit 1316 comprising a computer-readable storage medium 1318 on which is stored one or more sets of instructions 1320 (e.g., software code) configured to implement one or more of the methodologies, procedures, or functions described herein. The instructions 1320 can also reside, completely or at least partially, within the memory 1312 and/or within the CPU 1306 during execution thereof by the electronic device 1300. The memory 1312 and the CPU 1306 also can constitute machine-readable media. The term "machine-readable media", as used here, refers to a single medium or multiple media (e.g., a centralized or distributed database, and/or associated caches and servers) that store the one or more sets of instructions 1320. The term "machine-readable media", as used here, also refers to any medium that is capable of storing, encoding or carrying a set of instructions 1320 for execution by the electronic device 1300 and that cause the electronic device 1300 to perform any one or more of the methodologies of the present disclosure.

As noted above, the electronic device 100 is designed to have buoyancy without the need for any accessories. The electronic device 100 can float on the surface 1602 of a body of liquid 1600 in a generally horizontal. Liquid 1600 can include, but is not limited to, water. This allows users to quickly locate and retrieve the electronic device 100 when dropped or otherwise disposed in the body of liquid 1600.

When the electronic device 100 is dropped or otherwise disposed in the body of liquid 1600, the body of liquid 1600 exerts a stable upward force 1604 that opposes the weight of the partially or fully submersed electronic device 100. The magnitude of the stable upward force 1604 is equivalent to the weight of the liquid that would otherwise occupy the submerged volume of the electronic device 100, i.e., the displaced fluid. This weight of the liquid is larger than the weight of the electronic device, and the density of the electronic device is less than that of the liquid. For these reasons, the stable upward force 1604 causes the electronic device to float (and not sink) in the body of liquid 1600. The electronic device 100 has a Center of Gravity (CoG) 1606 that causes the electronic device to float horizontally on the surface of liquid with the display screen 104 facing in an upwards direction and located out of the body of liquid 1600. The CoG 1606 is aligned with a first axis 1608 of the electronic device 100 and offset from a second axis 1610 of the electronic device 100 by a given amount. The first axis 1608 extends from a front 1612 to a back 1614 of the electronic device 100, while the second axis 1610 extends from a top 1616 to a bottom 1618 of the electronic device.

Figure 21:
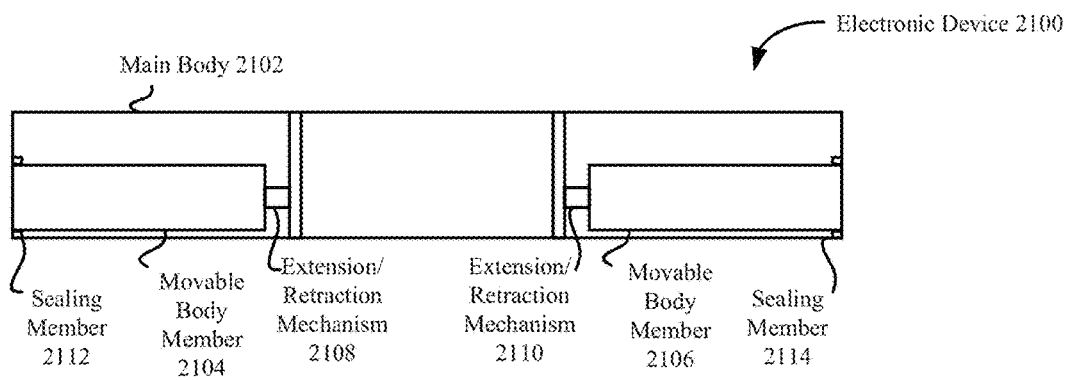
FIGS. 21-24 provides illustrations of electronic devices with motorized mechanisms for changing their overall sizes.
Figure 22:
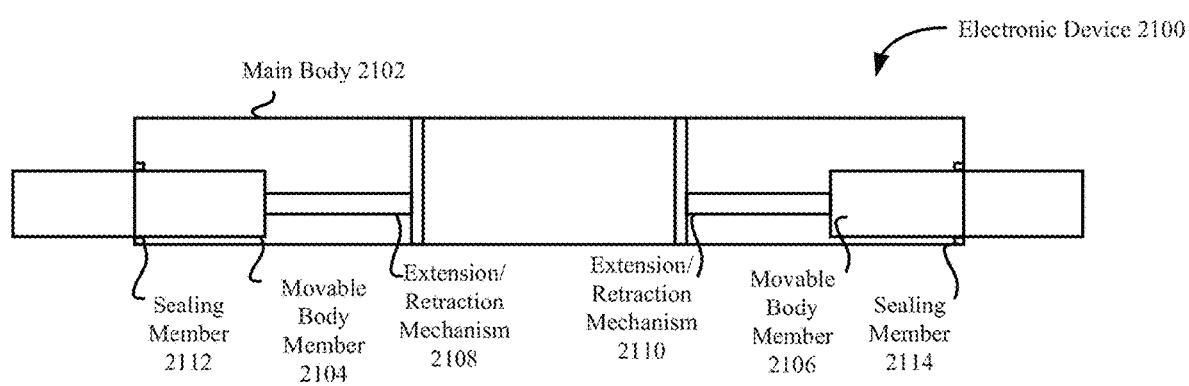

Referring now to FIGS. 21-22, there are provided illustrations showing another architecture for an electronic device 2100. The electronic device 2100 is similar to electronic device 100, but includes an additional motorized mechanism for dynamically and automatically varying an overall size of the electronic device in response to sensed or detected conditions of a surrounding environment. The motorized mechanism can include, but is not limited to, extension/retraction member(s) 2108, 2110 and movable body member(s) 2104, 2106. Each movable body member is configured to be transitioned from a retracted position as shown in FIG. 21 to an extended position as shown in FIG. 22. In this regard, the movable body member slidingly engages the main body 2102 and/or sealing member(s) 2112, 2114. The sealing member(s) 2112, 2114 is(are) configured to create an environmental seal and water-tight seal between the main body 2102 and the movable body member(s) 2104, 2106.

In the extended position, an internal hollow cavity (e.g., hollow cavity 500 of FIG. 5) of the electronic device is enlarged for increasing the buoyancy of the electronic device. In the retracted position, the internal hollow cavity is decreased to facilitate a more compact size of the electronic device. The transition between the retracted and extended positions is facilitated by the extension/retraction member(s) 2108, 2110. The extension/retraction member(s) 2108, 2110 can include, but are not limited to, motor(s), gear(s), rotatable post(s), expandable and/or retractable post(s), telescoping post(s), latch(es), resilient members (e.g., springs that are normally in a compressed state and when released transition to an uncompressed state), compressible members (e.g., depressible rubber structures), and/or electromagnets. Each of the listed components are well known.

For example, in some scenarios, the extension/retraction member comprises a spring that is in a compressed state when the movable body member is in its retracted position. When the spring is released (e.g., by a motorized latch), the spring transitions to its uncompressed state. During this transitioning, the spring applies a pushing force on the movable body member, whereby the movable body member is caused to slide out of the main body. The movable body may be optionally configured to be manually pressed back into the main body. When the movable body member reaches its fully retracted position, the spring is once again caused (e.g., by the motorized latch) to remain in its compressed state. The present solution is not limited in this regard. Electromagnets can additionally or alternatively be used to retain the movable body member in its retracted position.

Operations of the extension/retraction member(s) 2108, 2110 can be enabled or otherwise triggered in response to condition(s) sensed by sensors (e.g., sensors 1302 of FIG. 13) of the electronic device. The condition(s) can include, but are not limited to, a level/amount or threshold level/amount of liquid (e.g., water) in a surrounding environment, an amount or threshold amount of pressure being applied to the electronic device by an external liquid, a depth or threshold depth of the electronic device within the liquid, and/or an amount or threshold amount of time the electronic device is located at least partially in the liquid.

The present solution is not limited to the architecture of FIGS. 21-22. For example, a movable body member be provided on one side (e.g., left or right, bottom or top) of the main body rather than both as shown. Additionally or alternatively, each movable body member can include any number of telescoping components that side out of and/or into the main body. Also, the motorized mechanism can be designed for extension and not retraction of the movable body member. In this case, the movable body member may remain in the extended position or be manually pushed back into the retracted position.

Figure 23:
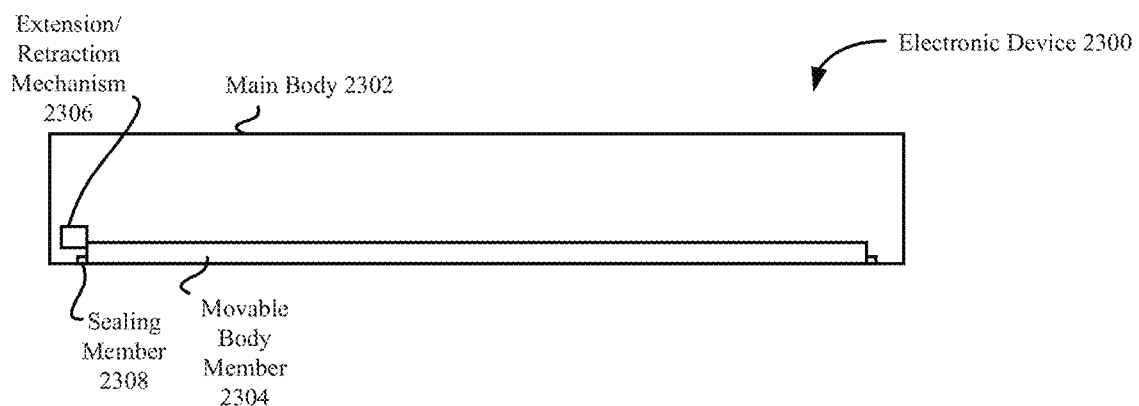
Figure 24:
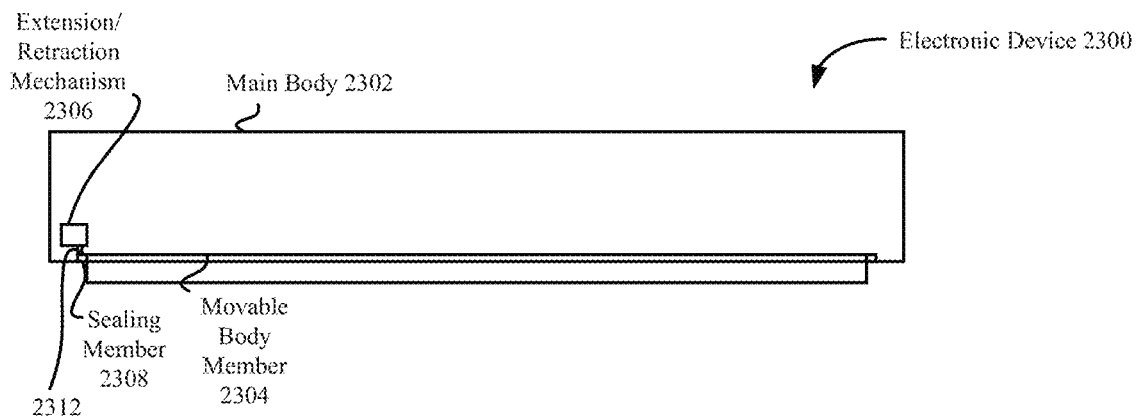

Referring now to FIGS. 23-24, there are provided illustrations showing another architecture for an electronic device 2300. The electronic device 2300 is similar to electronic device 100, but includes an additional motorized mechanism for dynamically and automatically varying an overall size of the electronic device in response to sensed or detected conditions of a surrounding environment. The motorized mechanism can include, but is not limited to, an extension/retraction member 2306 and a movable body member 2304. The movable body member is configured to be transitioned from a retracted position as shown in FIG. 23 to an extended position as shown in FIG. 24. In this regard, the movable body member 2304 slidingly engages the main body 2302 and/or sealing member(s) 2308. The sealing member(s) 2308 is(are) configured to create an environmental seal and water-tight seal between the main body 2302 and the movable body member 2304.

In the extended position, an internal hollow cavity (e.g., hollow cavity 500 of FIG. 5) of the electronic device is enlarged for increasing the buoyancy of the electronic device. In the retracted position, the internal hollow cavity is decreased to facilitate a more compact size of the electronic device. The transition between the retracted and extended positions is facilitated by the extension/retraction member 2306. The extension/retraction member 2306 can include, but are not limited to, motor(s), gear(s), rotatable post(s), expandable and/or retractable post(s), telescoping post(s), latch(es), resilient members (e.g., springs that are normally in a compressed state and when released transition to an uncompressed state), compressible members (e.g., depressible rubber structures), and/or electromagnets. Each of the listed components are well known.

Operations of the extension/retraction member 2306 can be enabled or otherwise triggered in response to condition(s) sensed by sensors (e.g., sensors 1302 of FIG. 13) of the electronic device. The condition(s) can include, but are not limited to, a level/amount or threshold level/amount of liquid (e.g., water) in a surrounding environment, an amount or threshold amount of pressure being applied to the electronic device by an external liquid, a depth or threshold depth of the electronic device within the liquid, and/or an amount or threshold amount of time the electronic device is located at least partially in the liquid.

The present solution is not limited to the architecture of FIGS. 23-24. For example, a movable body member be provided on two or more sides (e.g., left right, bottom and/or top) of the main body rather than on one side as shown in FIGS. 23-24. Additionally or alternatively, the movable body member 2304 can include any number of telescoping components that side out of and/or into the main body. Also, the motorized mechanism 2306 can be designed for extension and not retraction of the movable body member. In this case, the movable body member 2304 may remain in the extended position or be manually pushed back into the retracted position.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A buoyant portable device, comprising:
   a frame comprising a midframe with sidewalls defining an internal cavity; and
   a plurality of layers disposed in the internal cavity of the midframe, the plurality of layers comprising a cover layer, a cover/display layer, and a stack of densely packed intermediate layers residing between the cover layer and the cover/display layer;
   wherein the sidewalls of the midframe are configured to maintain a portion of the internal cavity as an empty space filled with air and residing between the cover layer and a first intermediate layer of the stack of densely packed intermediate layers;
   wherein the empty space has a size and shape providing an overall density of the buoyant portable device that is below a density of a liquid that the buoyant portable device displaces when the buoyant portable device is disposed in the liquid;
   wherein a second intermediate layer of the stack of densely packed intermediate layers comprises an electronic layer residing between the cover/display layer and the first intermediate layer;
   wherein the cover/display layer is configured to allow a user to interact with electronic components of the electronic layer and has an overall weight less than a combined weight of the frame and at least the cover layer; and
   wherein the electronic layer comprises a battery located between at least two spaced apart circuit boards.

2. The buoyant portable device according to claim 1, wherein the battery comprises a graphene-based battery.

3. The buoyant portable device according to claim 1, wherein the buoyant portable device comprises a smart phone, a portable computer, a tablet, a personal digital assistant, a portable music player, a portable gaming device, a handheld transceiver, a portable two-way radio, a portable electric machine, or a portable electric tool.

4. The buoyant portable device according to claim 1, wherein the cover layer has a density equal to or less than a density of the liquid.

5. The buoyant portable device according to claim 4, wherein the liquid comprises water.

6. The buoyant portable device according to claim 1, wherein the empty space occupies 5% to 25% of a total volume of the buoyant portable device.

7. The buoyant portable device according to claim 1, further comprising a center of gravity that causes the buoyant portable device, when disposed in the liquid, to float horizontally on a surface of the liquid with the cover/display layer facing an upward direction and residing above the surface of the liquid.

8. The buoyant portable device according to claim 1, wherein the center of gravity is aligned with a vertical axis of the buoyant portable device and is offset from a horizontal axis of the buoyant portable device, the vertical axis extending from the first layer to the cover/display layer and the horizontal axis extending perpendicular to the vertical axis.

9. The buoyant portable device according to claim 1, wherein the cover/display layer comprises a graphene-based display.

10. The buoyant portable device according to claim 1, wherein the buoyant portable device has a balanced distribution of weight in a horizontal plane of the buoyant portable device at least partially defined by the cover/display layers.

11. The buoyant portable device according to claim 10, wherein (i) the frame has a uniform thickness in the horizontal plane and (ii) the electronic layer has a balanced distribution of weight in the horizonal plane.

12. The buoyant portable device according to claim 10, wherein (i) the electronic layer has an unbalanced distribution of weight in the horizonal plane and (ii) the frame has a non-uniform thickness configured to balance a distribution of weight of the buoyant portable device in view of the unbalanced distribution of weight of the electronic layer.

13. The buoyant portable device according to claim 12, wherein the non-uniform thickness of the frame is provided by at least one detent or protrusion formed on an at least one sidewall of the frame.

14. The buoyant portable device according to claim 1, wherein a stable upward buoyant force is applied to the buoyant portable device when the buoyant portable device is disposed in liquid that is larger than a weight of the buoyant portable device.

15. A buoyant portable device, comprising:
   a frame comprising a midframe with sidewalls defining an internal cavity; and
   a plurality of layers disposed in the internal cavity of the midframe, the plurality of layers comprising a cover layer, a display layer, and a stack of densely packed intermediate layers residing between the cover layer and the display layer;
   wherein the sidewalls of the midframe are configured to maintain a portion of the internal cavity as an empty space filled with air and residing between the cover layer and a first intermediate layer of the stack of densely packed intermediate layers;
   wherein the empty space has a size and shape providing an overall density of the buoyant portable device that is below a density of a liquid that the buoyant portable device displaces when the buoyant portable device is disposed in the liquid;
   wherein a second intermediate layer of the stack of densely packed intermediate layers comprises an electronic layer residing between the display layer and the first intermediate layer;
   wherein the display layer is configured to allow a user to interact with electronic components of the electronic layer and has an overall weight less than a combined weight of the frame and at least the cover layer;
   wherein a size of the empty space is variable.

16. The buoyant portable device according to claim 15, further comprising an internal motorized mechanism configured to cause a change in the size of the empty space.

17. The buoyant portable device according to claim 16, wherein operations of the internal motorized mechanism are enabled in response to a condition sensed by a sensor of the buoyant portable device.

18. The buoyant portable device according to claim 17, wherein the condition comprises at least one of a level or amount of the liquid in a surrounding environment, an amount of pressure being applied to the buoyant portable device by the liquid, a depth of the electronic device within the liquid, and an amount of time the electronic device is located at least partially in the liquid.

* * * * *